(12) United States Patent
Murphy

(10) Patent No.: US 6,357,940 B1
(45) Date of Patent: Mar. 19, 2002

(54) CONFIGURABLE KEYGUARD FOR USE WITH TOUCH SENSITIVE KEYBOARD

(76) Inventor: Kevin Murphy, 97 Forrest St., Plaistow, NH (US) 03865

(*) Notice: Subject to any disclaimer, the term of this patent is extended or adjusted under 35 U.S.C. 154(b) by 0 days.

(21) Appl. No.: 09/570,967

(22) Filed: May 15, 2000

(51) Int. Cl.$^7$ .............................................. G09B 21/00
(52) U.S. Cl. ..................... 400/483; 400/485; 434/112; 434/113; 708/140; 708/143; 341/23; 341/34
(58) Field of Search ................................ 400/477, 483, 400/485; 434/112, 115, 113, 117; 708/140, 141, 142, 143, 145; 341/21, 22, 23, 24, 27, 34

(56) References Cited

U.S. PATENT DOCUMENTS

| | | | |
|---|---|---|---|
| 5,450,078 A | | 9/1995 | Silva et al. ..................... 341/23 |
| 5,536,170 A | * | 7/1996 | Murphy ....................... 434/113 |
| 6,059,575 A | * | 5/2000 | Murphy ....................... 434/112 |

OTHER PUBLICATIONS

IntelliTools, Inc., IntelliTools Fall 1998 Catalog, p. 11, Novato CA.*

* cited by examiner

*Primary Examiner*—John S. Hilten
*Assistant Examiner*—Kevin D. Williams
(74) *Attorney, Agent, or Firm*—Bourque & Associates, P.A.

(57) ABSTRACT

A configurable touch sensitive keyboard system is used to adjust or control the interface to a computer or other electronic device, particularly, for disabled individuals. The configurable touch sensitive keyboard system includes a touch sensitive keyboard having touch sensitive regions and a keyboard overlay having symbols corresponding to the touch sensitive regions. The symbols can be visually recognizable symbols or tactually recognizable symbols, such as Braille characters. A keyguard template is disposed on the keyboard over the overlay and includes keyboard access regions spatially separated on the keyguard. The keyboard access regions on the keyguard help disabled individuals to locate the touch sensitive regions for activation. Keyboard access cover members are used to selectively cover the keyboard access regions and the symbols and corresponding touch sensitive regions. By selectively covering the keyboard access regions using the cover members, the keyboard can be adjusted to suit the needs of a particular individual to improve the learning process and overall interaction with the computer or other electronic device.

20 Claims, 3 Drawing Sheets

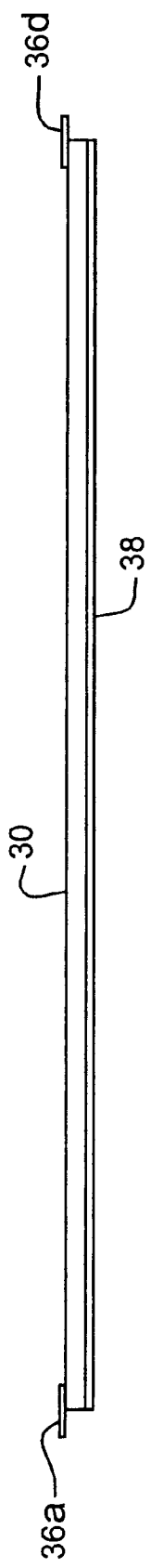
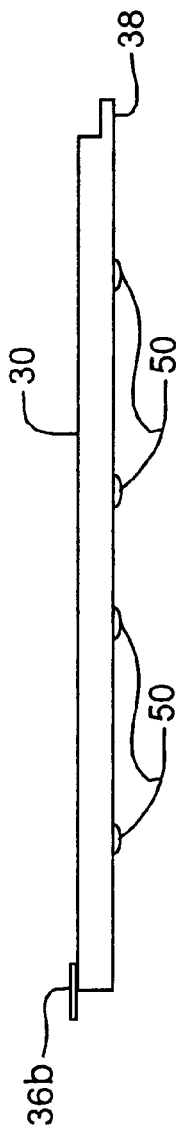
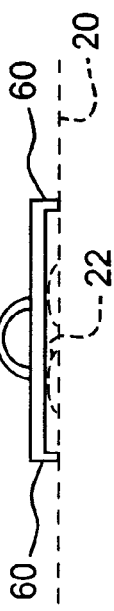
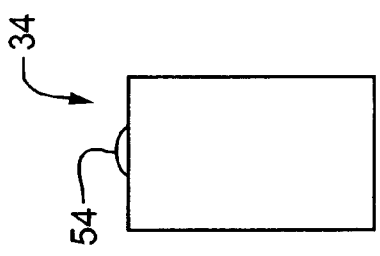
FIG. 3
FIG. 4
FIG. 5
FIG. 6

CONFIGURABLE KEYGUARD FOR USE WITH TOUCH SENSITIVE KEYBOARD

FIELD OF THE INVENTION

The present invention relates to touch sensitive. keyboards and more particularly, to a configurable keyguard for use over a touch sensitive keyboard to control the users access to touch sensitive regions on the keyboard.

BACKGROUND OF THE INVENTION

Computers can be useful tools for communicating with and/or teaching individuals with disabilities, if the individuals have a way of interacting with the computer. Special computer keyboards have been designed for individuals with motor difficulties from such disabilities as cerebral palsy, mental retardation, and brain trauma. One example is the touch sensitive keyboard available from Intellitools, Inc. of Novato, Calif. under the name INTELLIKEYS®, which is described in greater detail in U.S. Pat. No. 5,450,078, entitled MEMBRANE COMPUTER KEYBOARD AND METHOD and incorporated herein by reference. These touch sensitive keyboards use overlays with various letters, numbers, or symbols to allow disabled individuals to learn and play games with the computer. For example, the computer may ask the student questions requiring the student to properly answer the question by activating a touch sensitive region on the keyboard.

Even with this type of specially designed keyboard, some disabled individuals, particularly those having difficulty controlling motor skills, still have problems using the keyboard. Lack of motor skills often causes the individual to unintentionally touch a region on the touch sensitive keyboard, causing an unintentional keystroke to be entered into the computer. Students can easily be discouraged if this unintentional keystroke results in an inaccurate choice or answer to a question.

To prevent unintentional keystrokes on a touch sensitive keyboard, keyguards have been used over the keyboard. These keyguards are made of durable plastic and snap or lock on top of an overlay on the keyboard providing spatial separations for each key or touch sensitive region. The keyguard thus guides the disabled individual to the appropriate touch sensitive region and avoids unintentional keystrokes and inaccurate choices.

These keyguards still have some limitations, however. Existing keyguards are formed to a preexisting layout and are designed for preexisting keyboards and overlays. In order to change the size or number of keys available, different keyguards having different layouts are required. These existing keyguards are not attentive to the specific neurological advantages and disadvantages of each individual's condition. Also, the keyguards may not prevent unintentional activation of the touch sensitive keyboard caused by the keyguard itself contacting a touch sensitive region.

Accordingly, there is a need for a configurable keyguard that allows a user, such as an instructor, to modify the number of available keys and the layout of keys without having to replace the entire keyguard. Also, there is a need for a keyguard that is supported on the touch sensitive keyboard in such a way as to prevent the keyguard from contacting touch sensitive regions.

SUMMARY OF THE INVENTION

The present invention features a configurable keyguard for use with a touch sensitive keyboard. The configurable keyguard comprises a template adapted to fit over the touch sensitive keyboard. The template has a plurality of keyboard access regions extending through the template and spatially separated on the template. The keyboard access regions allow a user to access touch sensitive regions on the keyboard. The configurable keyguard further comprises a plurality of keyboard access cover members removably engageable with the keyboard access regions for covering at least one of the touch sensitive regions of the keyboard.

In one embodiment, the plurality of keyboard access regions form a grid on the template. The template can include one or more frame members along one or more edges of the template for supporting the template on the touch sensitive keyboard in a spaced relationship from the touch sensitive regions. The template can also include one or more contact members on a bottom surface thereof arranged to contact non-touch sensitive regions on the keyboard to prevent the template from inadvertently contacting the touch sensitive regions. The template can also include one or more support members extending into each of the keyboard access regions for supporting the keyboard access cover members. The template can also include tactually recognizable symbols and/or visually recognizable symbols along one or more sides thereof.

According to one embodiment, the keyboard access cover members include a handle on a top surface thereof for grasping the cover members and facilitating insertion and removal of the cover members. The number of keyboard access cover members preferably corresponds to the number of keyboard access regions in the template. Each of the keyboard access cover members can also include one or more detents on a side thereof for providing a friction fit within the keyboard access regions.

The present invention also features a keyguard for use with a touch sensitive keyboard having touch sensitive regions and non-touch sensitive regions. The keyguard comprises a template adapted to fit over the touch sensitive keyboard. The template has a plurality of keyboard access regions extending through the template and spatially separated on the template. The keyboard access regions allow a user to access at least one of the touch sensitive regions on the keyboard. At least one frame member along at least one edge of the template supports the template on the touch sensitive keyboard and spaces the template from the touch sensitive regions. At least one contact member on a bottom surface of the template is located to contact one of the non-touch sensitive regions on the touch sensitive keyguard, thereby preventing the template from contacting the touch sensitive regions.

The present invention also features a configurable touch sensitive keyboard system comprising a touch sensitive keyboard having a plurality of touch sensitive regions. A keyboard overlay is removably disposed on the touch sensitive keyboard and has a plurality of symbols corresponding to at least some of the touch sensitive regions. A keyguard template is removably disposed over the keyboard overlay and has a plurality of keyboard access regions extending through the template and spatially separated on the template. The keyboard access regions correspond to at least some of the plurality of symbols on the keyboard overlay to allow a user to access corresponding touch sensitive regions on the keyboard. A plurality of keyboard access cover members are removably engageable with the keyboard access regions for covering at least one of the symbols on the keyboard overlay and the corresponding touch sensitive region.

Symbols on the keyboard overlay can include tactually recognizable symbols, such as Braille characters. The keyboard access cover members preferably include one or more spacer members on a bottom surface thereof for spacing the cover members from the tactually recognizable symbols on the keyboard overlay.

DESCRIPTION OF THE DRAWINGS

These and other features and advantages of the present invention will be better understood by reading the following detailed description, taken together with the drawings wherein:

FIG. 3 is a side view of the configurable keyguard taken along line 3—3 in FIG. 2;

FIG. 4 is a side view of the configurable keyguard taken along line 4—4 in FIG. 2;

FIG. 5 is a plan view of a keyboard access cover member, according to one embodiment of the present invention; and FIG. 6 is a side elevational view of a keyboard access cover member, according to another embodiment of the present invention.

DETAILED DESCRIPTION OF THE PREFERRED EMBODIMENT

Figure 1:
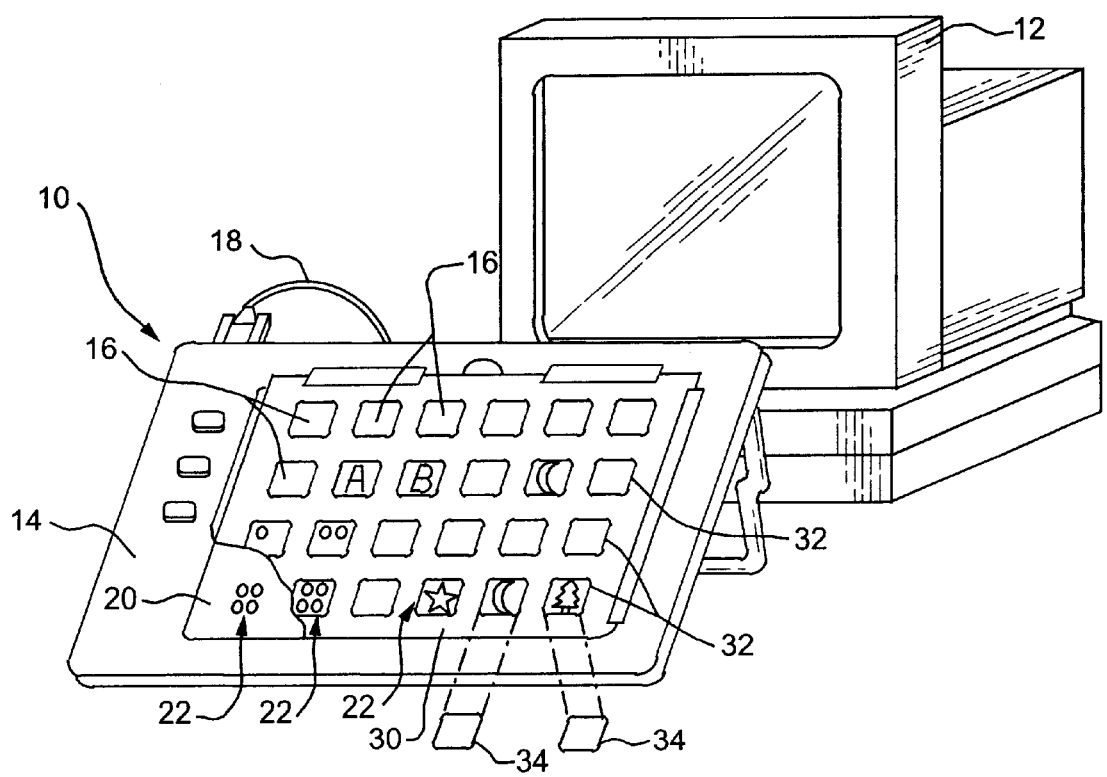
FIG. 1 is a perspective view of a configurable touch sensitive keyboard system, according to the present invention.

A configurable touch sensitive keyboard system 10, FIG. 1, according to the present invention, is used with a computer 12. A touch sensitive keyboard 14 having a plurality of touch sensitive regions 16 is coupled to the computer 12 by way of a cable 18. A keyboard overlay 20 having a plurality of symbols 22 corresponding to one or more of the touch sensitive regions 16 is disposed on the touch sensitive keyboard 14. The symbols 22 on the keyboard overlay 20 can include visually recognizable symbols, such as alpha numeric characters or shapes, and/or tactually recognizable symbols, such as Braille characters. One example of the touch sensitive keyboard 14 is the INTELLIKEYS® keyboard.

The configurable touch sensitive keyboard system 10 allows access to the symbols 22 and corresponding touch sensitive regions 16 to be selectively controlled, as will be described in greater detail below. Although the exemplary embodiment shows a configurable touch sensitive keyboard system for use with a computer, the configurable touch sensitive keyboard system of the present invention can also be used to control or interact with other types of electronic devices.

A keyguard template 30 is disposed on the touch sensitive keyboard 14 over the keyboard overlay 20. The keyguard template 30 includes a plurality of keyboard access regions 32 extending through the template 30 and spatially separated on the template 30. Each of the keyboard access regions 32 correspond to one or more touch sensitive regions 16 on the keyboard 14. The symbols 22 on the keyboard overlay 20 are accessible through the keyboard access regions 32 to allow the user to tactually or visually recognize the symbols 22.

Keyboard access cover members 34 are removably engageable with the keyboard access regions 32 to cover one or more of the symbols 22 on the keyboard overlay 20 and to prevent access to the corresponding touch sensitive regions 16 on the keyboard 14. By selectively covering the keyboard access regions 32 using the keyboard access cover members 34, the user's interface to the computer 12 can be controlled. The keyguard template 30 and cover members 34 are preferably made of a rigid material, such as plastic.

Figure 2:
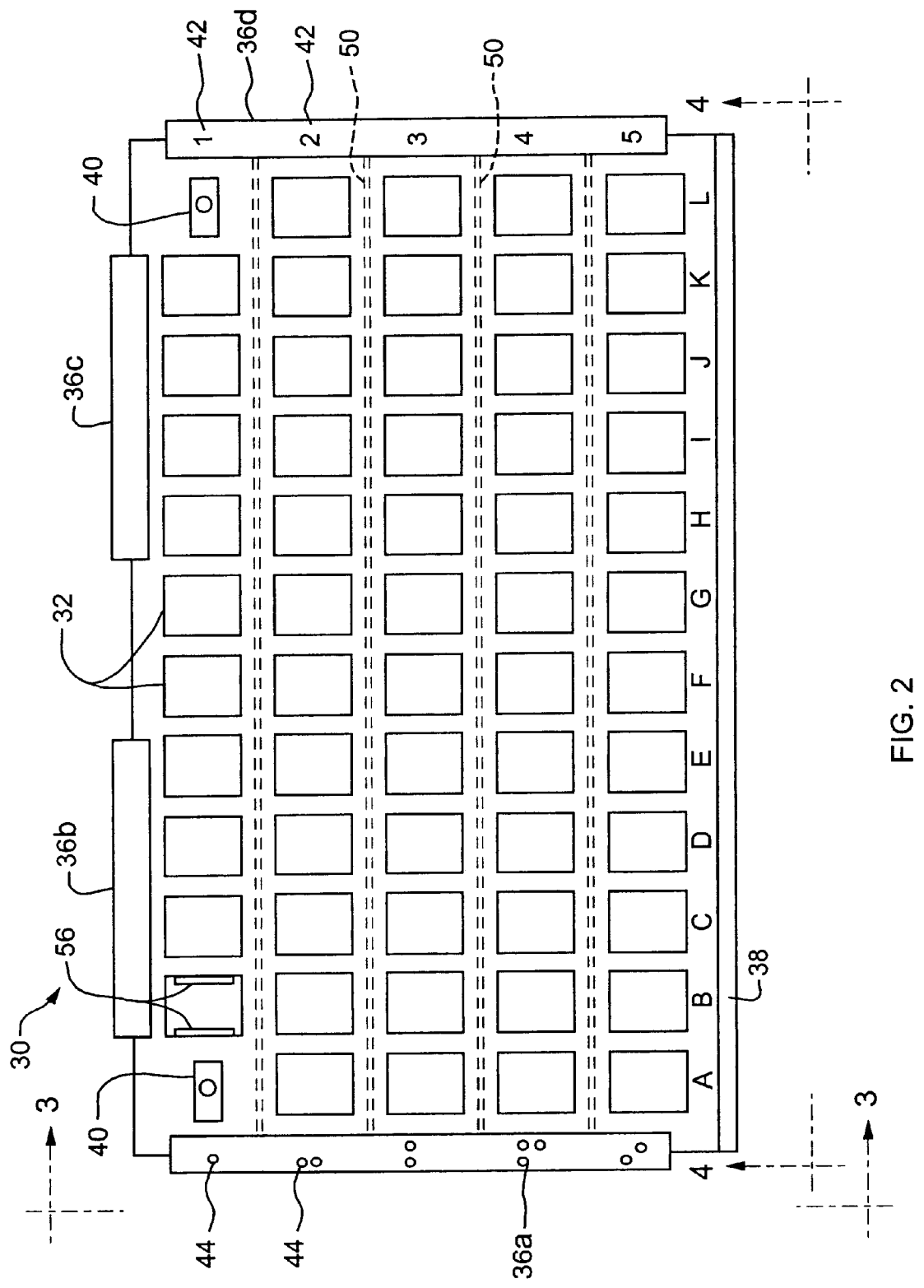
FIG. 2 is a plan view of a configurable keyguard, according to one embodiment of the present invention.

According to one embodiment, the keyguard template 30, FIGS. 2–4, is generally rectangular shaped and includes generally rectangular-shaped keyboard access regions 32 formed as a grid. In other embodiments, the keyboard access regions 32 can have various sizes and shapes and can be arranged in various configurations. The keyguard template 30 preferably includes one or more frame members 36a–d along one or more sides of the template 30. The frame members 36a–d support the template 30 on the keyboard 14 (see FIG. 1) such that the template 30 is spaced from the touch sensitive regions 16. At least one tab 38 along a bottom edge of the template 30 is inserted into a mating slot (not shown) in the keyboard 14 to secure the keyguard template 30 in place on the keyboard 14. In one embodiment, one or more sliding locking mechanisms 40 engage with the keyboard 14 to further secure the keyguard template 30 into place on the keyboard 14. Although the exemplary embodiment discloses a removable keyguard template 30, the keyguard template 30 can also be permanently attached to the keyboard 14.

Alpha-numeric characters can be provided along one or more sides of the keyguard template 30 corresponding with the rows and/or columns of keyboard access regions 32. For example, visually recognizable numbers 42 can be printed on one side with corresponding Braille numbers 44 on the opposite side of the template 30. The numbers and/or letters corresponding to the rows and columns of keyboard access regions 32 can be used to identify the keyboard access regions 32. Alpha-numeric characters (either visually or tactually recognizable) can also be positioned on the template 30 adjacent to each of the keyboard access regions 32.

In the preferred embodiment, one or more contact members 50, such as ridges, are located on a bottom surface of the template 30. The contact members 50 are located on the template to correspond with the non-touch sensitive regions on the touch sensitive keyboard 14. Thus, if the keyguard template 30 is pressed against the touch sensitive keyboard 14, the contact members 50 will contact the non-touch sensitive regions on the keyboard 14, thereby preventing inadvertent activation of touch sensitive regions 16. In one example, the touch sensitive keyboard 14 includes membranes (not shown) that cause a signal to be sent in response the membranes contacting one another (i.e., when touched), as is known to those of ordinary skill in the art. The membranes are typically attached or "stitched" together along regions that are not touch sensitive, and the contact members 50 are located to correspond to these non-touch sensitive regions. Although the contact members 50 are shown as longitudinal ridges, other shapes and configurations can also be used.

The keyboard access cover members 34, FIG. 5, preferably have a shape (e.g., generally rectangular) corresponding to the shape of the keyboard access regions 32. The keyboard access cover members 34 are designed to engage with the keyboard access regions 32 in a friction fit such that the keyboard access cover members 34 are removably engaged with the template 30. The keyboard access cover members 34 can include one or more detents 54 to provide the friction fit. The keyguard template 30 can also include support tabs 56 extending into the keyboard access regions 32 to support the keyboard access cover members 34 within the keyboard access regions 32 and prevent the cover members 34 from contacting the touch sensitive regions 16.

According to one embodiment (FIG. 5), the cover members 34 have a smooth top surface such that the cover member 34 and the template 30 together have a smooth and substantially uninterrupted surface. The cover members 34 therefore are not noticeable by the disabled user, cannot easily be removed by the user, and will not distract the user. The cover members 34 according to this embodiment are designed to be removable (e.g., by an instructor) by pressing from the bottom of the template 30.

According to another embodiment, each keyboard access cover member 34, FIG. 6, can include a handle 58 for grasping the keyboard access cover member 34 to facilitate insertion and removal of the keyboard access cover member with the keyboard access region 32. The keyboard access cover members 34 can also include tactually or visually recognizable symbols on the top surface of the cover members 34. The keyboard access cover member 34 can also include spacers 60 extending from a bottom surface to accommodate tactually recognizable symbols 22, such as Braille characters, and to prevent the cover member 34 from flattening these symbols.

The configurable touch sensitive keyboard system 10 can be used for numerous applications including, but not limited to, learning applications, games, and diagnostic applications. Some exemplary applications and uses will now be described in greater detail. According to one application, teaching individuals with motor difficulties and other disabilities can be controlled and adjusted using the configurable keyguard. If a student was learning Braille, for example, selected Braille characters and corresponding touch sensitive regions 16 can be covered with the cover members 34 such that the student is initially exposed to a relatively small number of options or answer choices. This can avoid overwhelming the student at the early stages of a particular learning application. As the student begins to master the learning application using the limited number of options, some of the cover members 34 can be removed to expose additional Braille characters and provide additional answer choices. For example, a teacher can create Braille sentences starting initially with a simple sentence structure, for example, having only a subject and predicate. When the student learns the simple sentence structure, the teacher can create more complex sentence structures by uncovering adjectives, prepositional phrases, etc.

In another application, the configurable touch sensitive keyboard system 10 can be used for games, such as a concentration game. The player can search for matching symbols 22 on the keyboard and after the player matches the symbols, the cover members 34 can be used to cover the matching symbols 22 and corresponding touch sensitive region 16. Alternatively, the game can begin with all of the symbols 22 and touch sensitive regions covered with cover members 34. The player can then remove the cover members 34 to find the matching symbols 22. The player can also find matching sounds or initiate another type of feedback or stimulation by pressing the touch sensitive regions. If the player discovers matching symbols, the cover members 34 can be removed and retained by the player. Multiple players could play against one another and score the game based upon the number of cover members retained as tokens.

In yet another application, the configurable touch sensitive keyboard can be used for diagnostic purposes. Some disabled individuals may only be able to access certain regions of the keyboard. For example, some disabled individuals can handle only horizontal rows, while some may be able to handle only vertical rows. Also, some visually disabled individuals may only be able to see certain sections of the keyboard. By selectively covering the symbols 22 and corresponding touch sensitive regions 16, the configurable touch sensitive keyboard can be used as a diagnostic tool to determine the visual and physical capabilities and limitations of these individuals. Once the capabilities and limitations are discovered, the learning applications and games can be configured or adjusted to suit the abilities of these individuals.

Accordingly, the configurable keyguard of the present invention allows a touch sensitive keyboard to be configured and adjusted to suit the needs of disabled individuals and improve the interface to and interaction with a computer. The configurable keyguard will enhance positive reinforcement for these disabled individuals improving the learning process and making computer games more enjoyable.

Modifications and substitutions by one of ordinary skill in the art are considered to be within the scope of the present invention which is not to be limited except by the claims which follow.

What is claimed is:

1. A configurable keyguard for use with a touch sensitive keyboard, said configurable keyguard comprising:
   a template adapted to fit over the touch sensitive keyboard, said template having a plurality of keyboard access regions extending through said template and spatially separated on said template, wherein said keyboard access regions allow a user to access touch sensitive regions on the keyboard; and
   a plurality of keyboard access cover members removably engageable with said keyboard access regions, for covering and preventing a user from touching at least one of the touch sensitive regions on the keyboard thereby preventing activation.

2. The configurable keyguard of claim 1 wherein said plurality of keyboard access regions form a grid on said template.

3. The configurable keyguard of claim 1 wherein said keyboard access regions have a generally rectangular shape and said keyboard access cover members have a matching generally rectangular shape.

4. The configurable keyguard of claim 1 wherein said template includes at least one contact member on a bottom surface thereof, for preventing said template from contacting the touch sensitive regions.

5. The configurable keyguard of claim 1 wherein said template includes at least one frame member along at least one edge of said template, for supporting said template on said touch sensitive keyboard.

6. The configurable keyguard of claim 5 wherein said template includes at least one tab along a bottom edge thereof, for insertion into a slot on said touch sensitive keyboard.

7. The configurable keyguard of claim 1 wherein said template includes at least one support member extending into each of said keyboard access regions, for supporting said keyboard access cover members.

8. The configurable keyguard of claim 1 wherein each of said keyboard access cover members includes a handle on a top surface thereof for grasping said keyboard access cover members and facilitating insertion and removal of said keyboard access cover members.

9. The configurable keyguard of claim 1 wherein each of said keyboard access cover members includes at least one spacing member on a bottom surface thereof, for spacing said keyboard access cover members from respective said touch sensitive regions.

10. The configurable keyguard of claim 1 wherein the number of said keyboard access cover members corresponds to the number of said keyboard access regions in said template.

11. The configurable keyguard of claim 1 wherein each of said keyboard access cover members includes at least one detent on a side thereof for providing a friction fit within said keyboard access regions.

12. The configurable keyguard of claim 1 wherein said template includes tactually recognizable symbols along at least one side thereof.

13. The configurable keyguard of claim 1 wherein said template includes visually recognizable symbols along at least one side thereof.

14. The configurable keyguard of claim 1 wherein said template includes tactually recognizable symbols along at least one side thereof and corresponding visually recognizable symbols along an opposite side thereof.

15. A keyguard for use with a touch sensitive keyboard having touch sensitive regions and non-touch sensitive regions, said keyguard comprising:

a template adapted to fit over the touch sensitive keyboard, said template having a plurality of keyboard access regions extending through said template and spatially separated on said template, wherein said keyboard access regions allow a user to access at least one of said touch sensitive regions on the keyboard;

at least one frame member along at least one edge of said template, for supporting said template on said touch sensitive keyboard and spacing said template from said touch sensitive regions; and at least one contact member protruding from a bottom surface of said template and defining an open space between said bottom surface of said template and said touch sensitive keyboard, wherein each said contact member is located to contact one of said non-touch sensitive regions of said touch sensitive keyguard, thereby preventing said template from contacting the touch sensitive regions.

16. The keyguard of claim 15 further comprising:

a plurality of keyboard access cover members removably engageable with said keyboard access regions, for covering and preventing access to at least one of the touch sensitive regions on the keyboard.

17. A configurable touch sensitive keyboard system comprising:

a touch sensitive keyboard having a plurality of touch sensitive regions;

a keyboard overlay disposed on said touch sensitive keyboard, said keyboard overlay having a plurality of symbols corresponding to at least some of said plurality of touch sensitive regions;

a keyguard template disposed over said keyboard overlay, said template having a plurality of keyboard access regions extending through said template and spatially separated on said template, wherein said keyboard access regions correspond to at least some of said plurality of symbols on said keyboard overlay to allow a user to access corresponding touch sensitive regions on said keyboard; and a plurality of keyboard access cover members removably engageable within said keyboard access regions, for covering and preventing access to at least one of said symbols on said keyboard overlay and said corresponding touch sensitive region.

18. The configurable touch sensitive keyboard system of claim 17 wherein said symbols on said keyboard overlay include tactually recognizable symbols.

19. The configurable touch sensitive keyboard system of claim 18 wherein said tactually recognizable symbols include Braille characters.

20. The configurable touch sensitive keyboard system of claim 18 wherein each of said keyboard access cover members include at least one spacing member on a bottom surface thereof, for spacing said keyboard access cover members from said tactually recognizable symbols on said keyboard overlay.

* * * * *